US011990622B2

(12) United States Patent
Tashita et al.

(10) Patent No.: US 11,990,622 B2
(45) Date of Patent: May 21, 2024

(54) NON-AQUEOUS ELECTROLYTE SECONDARY BATTERY

(71) Applicant: Panasonic Intellectual Property Management Co., Ltd., Osaka (JP)

(72) Inventors: Takamitsu Tashita, Tokushima (JP); Takuya Shinomiya, Osaka (JP); Fumikazu Mizukoshi, Tokushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 708 days.

(21) Appl. No.: 15/734,012

(22) PCT Filed: Jun. 4, 2019

(86) PCT No.: PCT/JP2019/022064
§ 371 (c)(1),
(2) Date: Dec. 1, 2020

(87) PCT Pub. No.: WO2019/239947
PCT Pub. Date: Dec. 19, 2019

(65) Prior Publication Data
US 2021/0218025 A1    Jul. 15, 2021

(30) Foreign Application Priority Data
Jun. 15, 2018 (JP) ................... 2018-114186

(51) Int. Cl.
H01M 4/587    (2010.01)
H01M 4/02     (2006.01)
(Continued)

(52) U.S. Cl.
CPC .......... *H01M 4/587* (2013.01); *H01M 4/622* (2013.01); *H01M 10/0525* (2013.01); *H01M 2004/021* (2013.01); *H01M 2004/027* (2013.01)

(58) Field of Classification Search
CPC ...... H01M 4/583; H01M 4/587; H01M 4/625; H01M 4/622; H01M 2004/021; H01M 2004/027
See application file for complete search history.

(56) References Cited

U.S. PATENT DOCUMENTS 5,677,082 A * 10/1997 Greinke ................ H01M 4/133
429/312
6,303,249 B1    10/2001 Sonobe et al.
(Continued)

FOREIGN PATENT DOCUMENTS

JP     4-342966 A    11/1992
JP     9-007597 A    1/1997
(Continued)

OTHER PUBLICATIONS

International Search Report dated Sep. 3, 2019, issued in counterpart application No. PCT/JP2019/022064 (1 page).
(Continued)

*Primary Examiner* — Christopher P Domone
(74) *Attorney, Agent, or Firm* — WHDA, LLP

(57) ABSTRACT

The purpose of the present disclosure is to provide a non-aqueous secondary battery that is able to suppress a decrease in charge-discharge cycle characteristics. The non-aqueous electrolyte secondary battery that is a mode of the present disclosure comprises a negative electrode having a negative electrode active material layer, wherein the negative electrode active material layer contains a negative electrode active material that contains graphite particles, and an SBR component selected from at least one of a styrene-
(Continued)

butadiene copolymer rubber and a modified product thereof, the internal porosity of the graphite particles is 1% to 5%, the porosity due to voids between particles of the negative electrode active material layer is 10% to 20%, and the content of the SBR component is 1.5 mass % to 3 mass % with respect to the mass of the negative electrode active material.

1 Claim, 2 Drawing Sheets

(51) Int. Cl.
*H01M 4/62* (2006.01)
*H01M 10/0525* (2010.01)

(56) References Cited

U.S. PATENT DOCUMENTS

| | | | |
|---|---|---|---|
| 6,344,296 | B1 | 2/2002 | Ishii et al. |
| 2008/0286654 | A1* | 11/2008 | Sawa ............... H01M 10/052 429/232 |
| 2010/0015514 | A1 | 1/2010 | Miyagi et al. |
| 2013/0309578 | A1 | 11/2013 | Umeno et al. |
| 2014/0227432 | A1 | 8/2014 | Liu et al. |
| 2016/0126550 | A1* | 5/2016 | Kano ............... H01M 10/054 252/182.1 |
| 2017/0110729 | A1* | 4/2017 | Tsuchiya ............... H01M 4/587 |

FOREIGN PATENT DOCUMENTS

| | | |
|---|---|---|
| JP | 9-320600 A | 12/1997 |
| JP | 10-021919 A | 1/1998 |
| JP | 10-236809 A | 9/1998 |
| JP | 11-288718 A | 10/1999 |
| JP | 2007-141830 A | 6/2007 |
| JP | 2008-311209 A | 12/2008 |
| JP | 2009-245940 A | 10/2009 |
| JP | 2012-216537 A | 11/2012 |
| JP | 2014-53154 A | 3/2014 |
| JP | 2015-141772 A | 8/2015 |
| JP | 2016-085906 A | 5/2016 |
| JP | 2017-069039 A | 4/2017 |
| WO | 2012/077653 A1 | 6/2012 |
| WO | 2012/133700 A1 | 10/2012 |

OTHER PUBLICATIONS

Extended (Supplementary) European Search Report dated Jun. 18, 2021, issued in counterpart EP application No. 19820394.5. (8 pages).

Office Action dated Feb. 7, 2024, issued in counterpart CN application No. 201980039730.3, with English translation. (8 pages).

* cited by examiner

NON-AQUEOUS ELECTROLYTE SECONDARY BATTERY

TECHNICAL FIELD

The present disclosure relates to a non-aqueous electrolyte secondary battery.

BACKGROUND ART

A non-aqueous electrolyte secondary battery including a carbon material used as a negative electrode active material is widely used as a secondary battery having a high energy density.

For example, Patent Literatures 1 to 3 disclose a non-aqueous electrolyte secondary battery including a graphite material used as a carbon material, the graphite material having a relatively large pore volume.

For example, Patent Literature 4 discloses a non-aqueous electrolyte secondary battery including densified carbon used as a carbon material, the densified carbon having a porosity due to closed pores of 5% or less.

For example, Patent Literatures 5 and 6 disclose a non-aqueous electrolyte secondary battery including a negative electrode including a styrene-butadiene copolymer rubber and a carbon material.

CITATION LIST

Patent Literature

PATENT LITERATURE 1: Japanese Unexamined Patent Application Publication No. H9-7597
PATENT LITERATURE 2: Japanese Unexamined Patent Application Publication No. H10-21919
PATENT LITERATURE 3: Japanese Unexamined Patent Application Publication No. H10-236809
PATENT LITERATURE 4: Japanese Unexamined Patent Application Publication No. H9-320600
PATENT LITERATURE 5: Japanese Unexamined Patent Application Publication No. H4-342966
PATENT LITERATURE 6: Japanese Unexamined Patent Application Publication No. H11-288718

SUMMARY

In view of improved reliability of a non-aqueous electrolyte secondary battery, suppression of deterioration in charging/discharging cyclic characteristics is required.

It is an advantage of the present disclosure to provide a non-aqueous electrolyte secondary battery that can achieve suppression of deterioration in charging/discharging cyclic characteristics.

A non-aqueous electrolyte secondary battery of one aspect of the present disclosure comprises a negative electrode having a negative electrode active material layer, the negative electrode active material layer including: a negative electrode active material including graphite particles; and at least one SBR component selected from the group consisting of a styrene-butadiene copolymer rubber and a modified product thereof, wherein the graphite particles have a porosity due to closed pores of 1% to 5%, the negative electrode active material layer has a porosity due to voids between particles of 10% to 20%, and the negative electrode active material layer has a content of the SBR component of 1.5 mass % to 3 mass % based on a mass of the negative electrode active material.

According to one aspect of the present disclosure, deterioration in charging/discharging cyclic characteristics can be suppressed.

Figure 1:
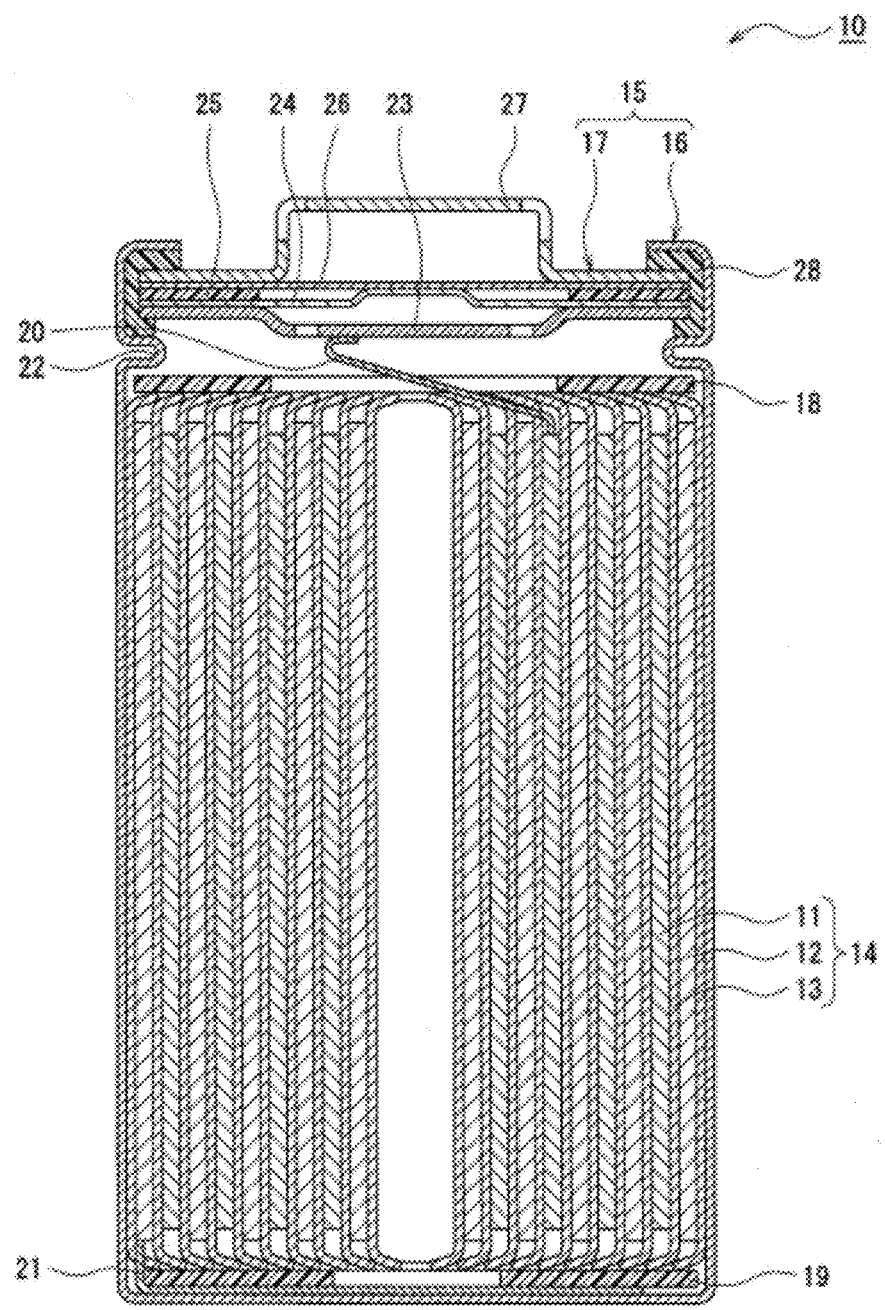
FIG. 1 is a sectional view illustrating a non-aqueous electrolyte secondary battery of an exemplary embodiment.

DESCRIPTION OF EMBODIMENTS (Basic Findings of Present Disclosure)

Breakage of graphite particles due to charging/discharging cycles and a subsequent decomposition reaction of a non-aqueous electrolyte, for example, are suppressed in the graphite particles having a small porosity due to closed pores to result in a tendency to suppress deterioration in charging/discharging cyclic characteristics of a non-aqueous electrolyte secondary battery, as compared to graphite particles having a large porosity due to closed pores. However, merely using graphite particles having a small porosity due to closed pores may not suppress effectively deterioration in charging/discharging cyclic characteristics of a non-aqueous electrolyte secondary battery. The reasons for this are considered, for example, as follows: in the case of using graphite particles having a small porosity due to closed pores, contact of graphite particles with a non-aqueous electrolyte is likely to be reduced, and also the particles are difficult to collapse upon formation of the electrode, which results in that the binding of particles to each other via a binder is likely to be reduced. As a result of earnest studies, the present inventors have found that for effectively suppressing deterioration in charging/discharging cyclic characteristics of a non-aqueous electrolyte secondary battery, it is necessary that the porosity due to voids between particles in the negative electrode active material layer included in the negative electrode be within a specific range, and also that the content of a styrene-butadiene copolymer rubber or a modified product thereof served as binder be within a specific range, in addition to using graphite particles having a small porosity due to closed pores; and the present inventors have thus reached to the non-aqueous electrolyte secondary battery of the aspect described below.

The non-aqueous electrolyte secondary battery of one aspect of the present disclosure comprises a negative electrode having a negative electrode active material layer, the negative electrode active material layer including: a negative electrode active material including graphite particles; and at least one SBR component selected from the group consisting of a styrene-butadiene copolymer rubber and a modified product thereof, wherein the graphite particles have a porosity due to closed pores of 1% to 5%, the negative electrode active material layer has a porosity due to voids between particles of 10% to 20%, and the negative electrode active material layer has a content of the SBR component of 1.5 mass % to 3 mass % based on a mass of the negative electrode active material.

When the negative electrode active material layer has a porosity due to voids between particles of 10% to 20% as in the aspect of the present disclosure, a certain amount of a non-aqueous electrolyte is retained in the negative electrode active material layer to thereby sufficiently ensure contact of the graphite particles having a porosity due to closed pores of 1% to 5% with the non-aqueous electrolyte. When the content of the SBR component is 1.5 mass % to 3 mass % as in the aspect of the present disclosure, sufficient adhesiveness of the graphite particles to each other is ensured. Thus, in the non-aqueous electrolyte secondary battery of the aspect of the present disclosure, reduction in contact of graphite particles with a non-aqueous electrolyte and reduction in the binding of graphite particles to each other are suppressed even when graphite particles having a small porosity due to closed pores are used. Accordingly, it is possible that deterioration in charging/discharging cyclic characteristics can be suppressed efficiently. If the negative electrode active material layer has a porosity due to voids between particles of more than 20%, the amount of the non-aqueous electrolyte retained is larger but the rate of graphite particles contacting with each other is smaller, which results in the difficulty with suppressing deterioration in charging/discharging cyclic characteristics. If the content of the SBR component is more than 3 mass %, adhesiveness of graphite particles to each other is higher but electric resistance on the interface of graphite particles are larger, which results in the difficulty with suppressing deterioration in charging/discharging cyclic characteristics.

Hereinafter, exemplary embodiments will be described in detail with reference to drawings. However, the non-aqueous electrolyte secondary battery of the present disclosure is not limited to the embodiments described hereinbelow. The drawings which are referred in the description of the embodiments are schematically illustrated.

FIG. 1 is a sectional view of a non-aqueous electrolyte secondary battery of an exemplary embodiment. The non-aqueous electrolyte secondary battery 10 shown in FIG. 1 comprises: an electrode assembly 14 having a wound structure in which a positive electrode 11 and a negative electrode 12 are wound together with a separator 13 interposed therebetween; a non-aqueous electrolyte; insulating plates 18 and 19 respectively disposed on the upper and lower sides of the electrode assembly 14; and a battery case 15 housing these members. The battery case 15 is constituted of a cylindrical case body 16 having a closed-end and a sealing assembly 17 for closing the opening of the case body 16. Alternatively to the electrode assembly 14 having a wound structure, an electrode assembly in another form may be applied, including an electrode assembly having a laminate structure in which positive electrodes and negative electrodes are laminated alternately with separators interposed therebetween. Examples of the battery case 15 include a metallic package can having a cylindrical shape, a rectangular shape, a coin shape, a button shape, or another shape, and a package pouch formed by laminating a metal sheet with a resin sheet.

The case body 16 is, for example, a cylindrical metallic package having a closed-end. A gasket 28 is provided between the case body 16 and the sealing assembly 17 to ensure that the battery case is tightly sealed. The case body 16 includes a projecting portion 22 formed by, for example, pressing the lateral surface from outside to support the sealing assembly 17. The projecting portion 22 is preferably formed annularly along the circumferential direction of the case body 16, and the upper surface thereof supports the sealing assembly 17.

The sealing assembly 17 includes the filter 23, a lower vent member 24, an insulating member 25, an upper vent member 26, and a cap 27, these members being piled in this order from the electrode assembly 14 side. Each of the members constituting the sealing assembly 17 has, for example, a disk or ring shape, and the members other than the insulating member 25 are electrically connected to each other. The lower vent member 24 and the upper vent member 26 are connected to each other at their middle portions and the insulating member 25 is interposed between their circumferences. If the internal pressure of the non-aqueous electrolyte secondary battery 10 increases by heat generation due to, for example, internal short, the lower vent member 24 changes its shape so as to, for example, push up the upper vent member 26 toward the cap 27, and the lower vent member 24 thus ruptures to break the electrical connection between the lower vent member 24 and the upper vent member 26. If the internal pressure further increases, the upper vent member 26 ruptures to discharge gas through the opening of the cap 27.

In the non-aqueous electrolyte secondary battery 10 shown in FIG. 1, a positive electrode lead 20 attached to the positive electrode 11 passes through a through-hole in the insulating plate 18 and extends toward the sealing assembly 17, and a negative electrode lead 21 attached to the negative electrode 12 extends on the outside of the insulating plate 19 to the bottom side of the case body 16. The positive electrode lead 20 is connected to the lower surface of the filter 23, which is the bottom board of the sealing assembly 17, by welding or the like, and the cap 27, which is the top board of the sealing assembly 17 and electrically connected to the filter 23, serves as a positive electrode terminal. The negative electrode lead 21 is connected to the inner surface of the bottom of the case body 16 by welding or the like, and the case body 16 serves as a negative electrode terminal.

Component elements of the non-aqueous electrolyte secondary battery 10 will be described in detail below.

[Negative Electrode]

The negative electrode 12 comprises metal foil or the like as a negative electrode current collector and a negative electrode active material layer formed on the current collector. As the negative electrode current collector, foil of a metal that is stable in the electric potential range of the negative electrode, such as copper, a film with such a metal disposed as an outer layer, or the like is used.

The negative electrode active material layer includes: a negative electrode active material including graphite particles; and at least one SBR component selected from the group consisting of a styrene-butadiene copolymer rubber and a modified product thereof. The negative electrode 12 may be produced by, for example, preparing a negative electrode mixture slurry including a negative electrode active material, a SBR component, and other components, applying the negative electrode mixture slurry to a negative electrode current collector, drying the resultant coatings to form negative electrode active material layers, and then press-molding the negative electrode active material layers.

Figure 2A:
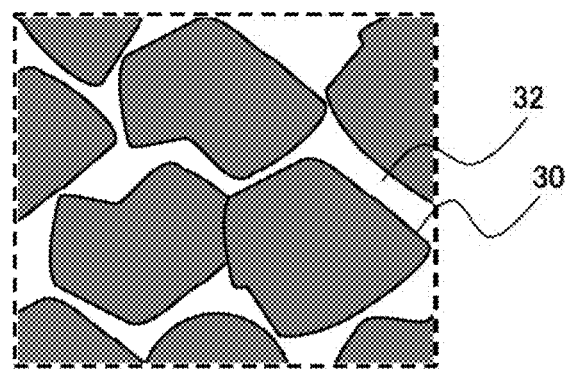
FIG. 2(A) is a schematic enlarged view showing a part of the section of the negative electrode active material layer.
Figure 2B:
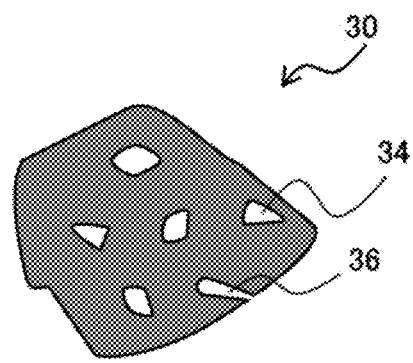
FIG. 2(B) is a schematic enlarged view showing the section of a graphite particle in the section of the negative electrode active material layer in FIG. 2(A).

FIG. 2(A) is a schematic enlarged view showing a part of the section of the negative electrode active material layer, and FIG. 2(B) is a schematic enlarged view showing the section of a graphite particle in the section of the negative electrode active material layer in FIG. 2(A). As shown in FIG. 2(A), the negative electrode active material layer includes voids 32 formed between particles such as graphite particles 30, the particles forming the negative electrode active material layer (hereinafter, referred to as voids 32 between particles). As shown in FIG. 2(B), the graphite particle 30 includes a pore 34 which is closed and does not reach any particle surface from the inner part of the particle (hereinafter, referred to as a closed pore 34), and a pore 36 which reaches a particle surface from the inner part of the particle (hereinafter, referred to as an open pore 36) in the sectional view of the graphite particle 30.

In the negative electrode active material layer, the porosity due to the voids between particles can be 10% to 20% as described above, in view of suppression of deterioration in charging/discharging cyclic characteristics, and it is preferably 12% to 18%, and more preferably 14% to 16%. In the graphite particles 30, the porosity due to closed pores can be 1% to 5% as described above, in view of suppression of deterioration in charging/discharging cyclic characteristics, and it is preferably 3% to 5%. The porosity due to voids between particles in the negative electrode active material layer is a two-dimensional value, and is the ratio of the area of the voids 32 between particles in the negative electrode active material layer to the area of the cross section of the negative electrode active material layer. The porosity due to closed pores in the graphite particles 30 is a two-dimensional value, and is the ratio of the area of the closed pores 34 in the graphite particles 30 to the area of the cross section of the graphite particles 30. The porosity due to voids between particles in the negative electrode active material layer and the porosity due to the closed pores in the graphite particles 30 can be determined in the following manner.

<Method for Determination of Porosity Due to Voids Between Particles and Porosity Due to Closed Pores>

(1) A cross section of a negative electrode active material is exposed. The method for exposing the cross section may be, for example, a method including cutting out a part of a negative electrode and processing the resultant with an ion-milling machine (e.g., IM4000, manufactured by Hitachi High-Tech Corporation) to expose a cross section of the negative electrode active material layer.

(2) A backscattered electron image of the exposed cross section of the negative electrode active material layer is taken using a scanning electron microscope. When the porosity due to voids between particles in the negative electrode active material layer is determined, the backscattered electron image is taken at a magnification of 1000×, and when the porosity due to closed pores in the graphite particles is determined, the backscattered electron image is taken at a magnification of 3000× to 5000×.

(3) The obtained image of the cross section is imported into a computer, and a binarization process is carried out using an image analysis soft (e.g., ImageJ, manufactured by National Institutes of Health, US) to obtain a binarized image in which the color of the cross sections of particles and the color of pores present in the cross sections of the particles and the voids between the particles in the cross section image are converted to black and white, respectively.

(4-1) When the porosity due to closed pores in the graphite particles is determined, graphite particles having a particle size of 5 μm to 50 μm are selected in the binarized image and the area of the cross section of the graphite particle and the area of the closed pores present in the cross section of the graphite particle are calculated, using an image analysis soft. The area of the cross section of a graphite particle here refers to the area of the region surrounded by the outer circumference of the graphite particle, i.e., the whole area of the cross section of the graphite particle. Among pores present in the cross section of a graphite particle, a pore having a width of 3 μm or less may be difficult to identify as either a closed pore or an open pore in the image analysis, and therefore, a pore having a width of 3 μm or less may be regarded as a closed pore. Then, from the area of the cross section of a graphite particle and the area of the closed pores in the cross section of the graphite particle calculated, the porosity due to closed pores of the graphite particle (the area of the closed pores in the cross section of the graphite particle×100/the area of the cross section of the graphite particle) is calculated. An average for ten graphite particles is taken as the porosity due to closed pores of graphite particles.

(4-2) When the porosity due to voids between particles in the negative electrode active material layer is determined, the area of voids between particles in a region for determination (50 μm×50 μm) in the binarized image is calculated using an image analysis soft. The region for determination is regarded as the area of the cross section of the negative electrode active material layer (2500 μm$^2$=50 μm×50 μm), and from the area of the voids between particles calculated, the porosity due to voids between particles in the negative electrode active material layer (the area of the voids between particles x 100/the area of the cross section of the negative electrode active material layer) is calculated.

The porosity due to voids between particles in the negative electrode active material layer can be controlled by, for example, the pressure when press-molding the negative electrode active material layer. The pressure in press-molding depends on, for example, the thickness of the negative electrode active material layer, and the linear pressure in press-molding the negative electrode active material layer with a mill roll is desirably within a range from 60 kg/cm to 500 kg/cm, for example.

The porosity due to voids between particles in the negative electrode active material layer can also be controlled by, for example, the saturated tap density of the negative electrode active material. The saturated tap density of the negative electrode active material is preferably within a range from 0.8 g/cm$^3$ to 1.2 g/cm$^3$ in view of, for example, easily controlling the porosity due to voids between particles in the negative electrode active material layer within a range from 10% to 20%. The saturated tap density of the graphite particles 30 may be out of the range described above; however, if it is out of the range described above, some kinds of graphite particles 30 having different saturated tap densities are preferably mixed so that the saturated tap density of the negative electrode active material is within the range described above.

The saturated tap density can be measured with an instrument for measuring a degree of reduction of powder (TPM-1, manufactured by TSUTSUI SCIENTIFIC INSTRUMENTS CO., LTD.). Specifically, 50 g of a sample (powder) is put in a 150-ml graduated glass cylinder, followed by tapping 1000 times with an instrument for measuring a degree of reduction of powder at a stroke of 30 mm, and then the bulk density of the resulting powder is determined. The found density is taken as the saturated tap density.

The porosity due to closed pores in the graphite particles 30 can be controlled in the manufacturing process of the graphite particles, for example.

<Porosity Due to Closed Pores: 1% to 5%>

For example, coke (precursor) as a main raw material is crushed into a predetermined size, and the resultant in an aggregated state with a binder is fired at a temperature of 2600° C. or higher to graphitize, followed by sieving to thereby obtain graphite particles 30 having a desired size. The porosity due to closed pores in graphite particles 30 can be controlled by, for example, the particle size of the precursor after crushing and the particle size of the precursor in an aggregated state. For obtaining graphite particles 30 having a porosity due to closed pores of 1% to 5%, the average particle size (median diameter based on volume, D50) of the precursor after crushing is preferably within a range from 12 µm to 20 µm, for example. For a smaller porosity due to closed pores within a range of 5% or less, the particle size of the precursor after crushing is preferably larger.

<Porosity Due to Closed Pores: 10% or More>

For example, coke (precursor) as a main raw material is crushed into a predetermined size, and the resulting coke is aggregated with a binder. The resultant is further press-molded into a block shape and fired at a temperature of 2600° C. or higher to graphitize. The molded product in a block shape after graphitization is crushed and sieved to thereby obtain graphite particles having a desired size. The porosity due to closed pores can be controlled to 10% or more by the amount of the volatile components included in the molded product in a block shape. In the case where a part of the binder added to the coke (precursor) volatilizes upon firing, the binder can be used as a volatile component. Examples of such a binder include pitch. The amount of the volatile component added is preferably 8 mass % or more based on the molded products in a block shape.

Examples of the graphite particles 30 used in the embodiment includes, but not particularly limited to, natural graphite and artificial graphite, and artificial graphite is preferred in view of, for example, ease of controlling the porosity due to closed pores. For the graphite particles used in the embodiment, the lattice spacing (d002) of (002) plane in wide-angle X-ray diffraction is preferably 0.3354 nm or more, more preferably 0.3357 nm or more, and preferably less than 0.340 nm, more preferably 0.338 nm or less, for example. For the graphite particles used in the embodiment, the crystallite size (Lc(002)) determined by X-ray diffraction is preferably 5 nm or more, more preferably 10 nm or more, and preferably 300 nm or less, more preferably 200 nm or less, for example. In the case where the lattice spacing (d002) and the crystallite size (Lc(002)) are within the respective ranges described above, the battery capacity of the non-aqueous electrolyte secondary battery tends to be larger as compared with the case where they are out of the above-described ranges.

The negative electrode active material may include other material that can reversibly intercalate and deintercalate lithium ions in addition to the graphite particles 30 used in the present embodiment, and specifically, may include, for example, a metal that can be alloyed with lithium, such as silicon (Si) and tin (Sn), or and an alloy or oxide that includes a metal element such as Si or Sn. If the content of the other material is large, the suppressing effect on deterioration in charging/discharging cyclic characteristics of the non-aqueous electrolyte secondary battery may not be provided sufficiently, and thus, the content of the other material is desirably 10 mass % or less based on the mass of the negative electrode active material, for example.

The SBR component used in the present embodiment, which includes at least one of the group consisting of a styrene-butadiene copolymer rubber and a modified product thereof, serves as a binder for binding the graphite particles 30 to each other. The modified product is, for example, a product obtained by modifying a styrene-butadiene copolymer rubber with a modifier having a polar group, and examples thereof include, but not particularly limited to, an amine-modified product, a fluorine-modified product, a carboxyl-modified product, an epoxy-modified product, and an alcohol-modified product.

As described hereinbefore, the content of the SBR component is 1.5 mass % to 3 mass %, and preferably 2 mass % to 2.8 mass %, based on the mass of the negative electrode active material, in view of suppressing on deterioration in charging/discharging cyclic characteristics of the non-aqueous electrolyte secondary battery.

The binder may include another component in addition to the SBR component. Specifically, the binder may include a fluororesin, PAN, polyimide, an acrylic resin, polyolefin, or the like, and may also include CMC or a salt thereof, polyacrylic acid (PAA) or a salt thereof, polyvinyl alcohol (PVA), or the like.

[Positive Electrode]

The positive electrode 11 comprises metal foil or the like as a positive electrode current collector and a positive electrode active material layer formed on the positive electrode current collector. As the positive electrode current collector, foil of a metal that is stable in the electric potential range of the positive electrode, such as aluminum, a film with such a metal disposed as an outer layer, or the like may be used. The positive electrode active material layer includes, for example, a positive electrode active material, a binder, a conductive agent, and other components.

For example, the positive electrode 11 can be produced by applying a positive electrode mixture slurry including a positive electrode active material, a binder, a conductive agent, and other components to a positive electrode current collector, drying the resultant coatings to form positive electrode active material layers, and then press-molding the positive electrode active material layers.

Examples of the positive electrode active material include a lithium/transition metal oxide, which contains a transition metal element such as Co, Mn, or Ni. Examples of the lithium/transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used singly or two or more thereof may be mixed and used. The positive electrode active material preferably include a lithium/nickel complex oxide such as $Li_xNiO_2$, $Li_xCo_yNi_{1-y}O_2$, $Li_xNi_{1-y}M_yO_z$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$), in view of obtaining a high capacity of a non-aqueous electrolyte secondary battery.

Examples of the conductive agent include carbon particles such as carbon black (CB), acetylene black (AB), Ketjenblack, and graphite. These may be used singly or in combinations of two or more thereof.

Examples of the binder include fluororesins, such as polytetrafluoroethylene (PTFE) and poly(vinylidene fluoride) (PVdF), polyacrylonitrile (PAN), polyimide resins, acrylic resins, and polyolefin resins. These may be used singly or in combinations of two or more thereof

[Separator]

For example, an ion-permeable and insulating porous sheet is used as the separator 13. Specific examples of the porous sheet include a microporous thin film, woven fabric, and nonwoven fabric. Suitable examples of the material for the separator include olefin resins such as polyethylene and polypropylene, and cellulose. The separator 13 may be a laminate including a cellulose fiber layer and a layer of fibers of a thermoplastic resin such as an olefin resin. The separator 13 may be a multi-layered separator including a polyethylene layer and a polypropylene layer, and a surface of the separator to be used may be coated with a material such as an aramid resin or ceramic.

[Non-Aqueous Electrolyte]

The non-aqueous electrolyte includes a non-aqueous solvent and an electrolyte salt dissolved in the non-aqueous solvent. The non-aqueous electrolyte is not limited to a liquid electrolyte (electrolyte solution), and may be a solid electrolyte using a gel polymer or the like. Example of the non-aqueous solvent to be used include esters, ethers, nitriles such as acetonitrile, amides such as dimethylformamide, and mixed solvents of two or more thereof. The non-aqueous solvent may include a halogen-substituted product formed by replacing at least one hydrogen atom of any of the above solvents with a halogen atom such as fluorine.

Examples of the esters include cyclic carbonate esters, such as ethylene carbonate (EC), propylene carbonate (PC), and butylene carbonate: chain carbonate esters, such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylate esters such as γ-butyrolactone and γ-valerolactone; and chain carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Preferable examples of the halogen-substituted product for use include a fluorinated cyclic carbonate ester such as fluoroethylene carbonate (FEC), a fluorinated chain carbonate ester, a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(CnF_{2n+1})_x$ (where $1 \leq x \leq 6$, and n is 1 or 2), $LiB_{10}Cl_{10}$, LiCl, LiBr, LiI, chloroborane lithium, lithium short-chain aliphatic carboxylates; borate salts such as $Li_2B_4O_7$, $Li(B(C_2O_4)F_2)$; and imide salts such as $LiN(SO_2CF_3)_2$ and $LiN(C_lF_{2l+1}SO_2)(C_mF_{2m+1}SO_2)$ (where l and m are integers of 1 or more). These lithium salts may be used singly or two or more thereof may be mixed and used. Among these, $LiPF_6$ is preferably used in view of ionic conductivity, electrochemical stability, and other properties. The concentration of the lithium salt is preferably 0.8 to 1.8 mol per L of solvent.

EXAMPLES

Hereinafter, the present disclosure will be described in more details by way of Examples, but the present disclosure is not limited thereby.

Example 1

[Production of Positive Electrode]

Cobalt carbonate, and 0.1 mol % of zirconium, 1 mol % of magnesium, and 1 mol % of aluminum, each based on cobalt, were coprecipitated, and the resultant was subjected to pyrolysis reaction to obtain cobalt tetraoxide containing zirconium, magnesium, and aluminum. Lithium carbonate was added thereto, and the mixture is fired at 850° C. for 20 hours to obtain lithium cobalt oxide containing zirconium, magnesium, and aluminum ($LiCo_{0.979}Zr_{0.001}Mg_{0.01}Al_{0.01}O_2$). This was used as a positive electrode active material.

95 parts by mass of the above-described positive electrode active material, 2.5 parts by mass of a carbon powder as a conductive agent, and 2.5 parts by mass of a powder of poly(vinylidene fluoride) as a binder were mixed, and an adequate amount of N-methyl-2-pyrrolidone (NMP) was further added thereto to prepare a positive electrode mixture slurry. This slurry was applied to both sides of aluminum foil (thickness: 15 μm) as a current collector by doctor blade method, and the coatings were dried and then pressed with a mill roll, to thereby produce a positive electrode having positive electrode active material layers formed on the both respective sides of the positive electrode current collector.

[Production of Negative Electrode Active Material]

Coke was crushed to an average particle size (median diameter D50) of 12 μm. Pitch as a binder was added to the crushed coke, and the coke was allowed to aggregate to an average particle size (median diameter D50) of 17 μm. This aggregate was fired at a temperature of 2800° C. for graphitization, and sieving the graphitized product was then carried out with 250-mesh sieve to obtain graphite particles having an average particle size (median diameter D50) of 23 μm. This was used as a negative electrode active material.

[Production of Negative Electrode]

The above-described negative electrode active material, carboxymethyl cellulose (CMC), and a styrene-butadiene copolymer rubber (SBR) were mixed in a mass ratio, negative electrode active material: CMC:SBR, of 100:1.5:1.5 to prepare a negative electrode mixture slurry. This slurry was applied to both sides of copper foil as a current collector by doctor blade method, and the coatings were dried and then pressed with a mill roll at a linear pressure of 160 kg/cm, to thereby produce a negative electrode having negative electrode active material layers formed on the both respective sides of a negative electrode current collector. On the produced negative electrode, the porosity due to closed pores of the graphite particles, and the porosity due to voids between particles in the negative electrode active material layer were determined and found to be 3% and 15%, respectively. The determination methods were as described hereinbefore and are omitted here.

[Production of Non-Aqueous Electrolyte]

Ethylene carbonate (EC), methyl ethyl carbonate (MEC), and diethyl carbonate (DEC) were mixed in a volume ratio of 30:60:10. $LiPF_6$ was dissolved in the resulting mixed non-aqueous solvent to a concentration of 1.0 mol/L. In addition, in the resulting solution, 2 mass % of vinylene carbonate (VC) and 1 mass % of fluoroethylene carbonate based on the whole amount of the solution were dissolved. The resulting product was used as a non-aqueous electrolyte.

[Production of Non-Aqueous Electrolyte Secondary Battery]

(1) The above-described positive electrode and negative electrode were wound together with a microporous polyethylene film interposed therebetween as a separator to produce an electrode assembly, and the electrode assembly was then pressed to make a flat wound electrode assembly.

(2) A laminate material in a sheet form having a five-layer structure, specifically, polypropylene resin layer/adhesive layer/aluminum alloy layer/adhesive layer/polypropylene resin layer, was provided. The laminate material was turned up to form a bottom portion, thereby forming a space in the form of a cup for housing an electro assembly. The resultant was used as a package of a battery.

(3) In an argon atmosphere in a glove box, the above-described electrode assembly and non-aqueous electrolyte were housed in the housing space of the package, and then, the inside of the package was decompressed to impregnate the separator with the non-aqueous electrolyte. The opening of the package was sealed to produce a non-aqueous electrolyte secondary battery having a height of 62 mm, a width of 35 mm, and a thickness of 3.6 mm.

Example 2

In producing a negative electrode, the same conditions as in Example 1 were applied, except that the negative electrode active material, carboxymethyl cellulose (CMC), and a styrene-butadiene copolymer rubber (SBR) were mixed in a mass ratio, negative electrode active material: CMC:SBR, of 100:1.5:2.0. In the produced negative electrode, the porosity due to closed pores of the graphite particles, and the porosity due to voids between particles in the negative electrode active material layer were the same as in Example 1. A non-aqueous electrolyte secondary battery was produced in the same manner as in Example 1, except that the produced negative electrode described above was used.

Example 3

In producing a negative electrode, the same conditions as in Example 1 were applied, except that the negative electrode active material, carboxymethyl cellulose (CMC), and a styrene-butadiene copolymer rubber (SBR) were mixed in a mass ratio, negative electrode active material: CMC:SBR, of 100:1.5:2.5. In the produced negative electrode, the porosity due to closed pores of the graphite particles, and the porosity due to voids between particles in the negative electrode active material layer were the same as in Example 1. A non-aqueous electrolyte secondary battery was produced in the same manner as in Example 1, except that the produced negative electrode described above was used.

Example 4

In producing a negative electrode, the same conditions as in Example 1 were applied, except that the negative electrode active material, carboxymethyl cellulose (CMC), and a styrene-butadiene copolymer rubber (SBR) were mixed in a mass ratio, negative electrode active material: CMC:SBR, of 100:1.5:2.5, and that the linear pressure when pressing the coatings with a mill roll was changed to 200 kg/cm. In the produced negative electrode, the porosity due to closed pores of the graphite particles was the same as in Example 1, and the porosity due to voids between particles in the negative electrode active material layer was 11%. A non-aqueous electrolyte secondary battery was produced in the same manner as in Example 1, except that the produced negative electrode described above was used.

Example 5

In producing a negative electrode, the same conditions as in Example 1 were applied, except that the negative electrode active material, carboxymethyl cellulose (CMC), and a styrene-butadiene copolymer rubber (SBR) were mixed in a mass ratio, negative electrode active material: CMC:SBR, of 100:1.5:2.5, and that the linear pressure when pressing the coatings with a mill roll was changed to 120 kg/cm. In the produced negative electrode, the porosity due to closed pores of the graphite particles was the same as in Example 1, and the porosity due to voids between particles in the negative electrode active material layer was 18%. A non-aqueous electrolyte secondary battery was produced in the same manner as in Example 1, except that the produced negative electrode described above was used.

Example 6

In producing a negative electrode, the same conditions as in Example 1 were applied, except that the negative electrode active material, carboxymethyl cellulose (CMC), and a styrene-butadiene copolymer rubber (SBR) were mixed in a mass ratio, negative electrode active material: CMC:SBR, of 100:1.5:3.0, and that the linear pressure when pressing the coatings with a mill roll was changed to 160 kg/cm. In the produced negative electrode, the porosity due to closed pores of the graphite particles was the same as in Example 1, and the porosity due to voids between particles in the negative electrode active material layer was 15%. A non-aqueous electrolyte secondary battery was produced in the same manner as in Example 1, except that the produced negative electrode described above was used.

Example 7

In producing a negative electrode active material, the same conditions as in Example 1 were applied, except that the average particle size (median diameter D50) of the coke after crashing was changed to 15 μm. A negative electrode and then a non-aqueous electrolyte secondary battery were produced in the same manner as in Example 1, except that the produced negative electrode active material described above was used, and that the negative electrode active material, carboxymethyl cellulose (CMC), and a styrene-butadiene copolymer rubber (SBR) were mixed in a mass ratio, negative electrode active material: CMC:SBR, of 100:1.5:2.5. In the produced negative electrode, the porosity due to closed pores of the graphite particles was 1%, and the porosity due to voids between particles in the negative electrode active material layer was the same as in Example 1.

Example 8

In producing a negative electrode active material, the same conditions as in Example 1 were applied, except that the average particle size (median diameter D50) of the coke after crashing was changed to 10 μm. A negative electrode and then a non-aqueous electrolyte secondary battery were produced in the same manner as in Example 1, except that the produced negative electrode active material described above was used, and that the negative electrode active material, carboxymethyl cellulose (CMC), and a styrene-butadiene copolymer rubber (SBR) were mixed in a mass ratio, negative electrode active material: CMC:SBR, of 100:1.5:2.5. In the produced negative electrode, the porosity due to closed pores of the graphite particles was 5%, and the porosity due to voids between particles in the negative electrode active material layer was the same as in Example 1.

Comparative Example 1

In producing a negative electrode, the same conditions as in Example 1 were applied, except that the negative electrode active material produced in Example 7 was used, and that the negative electrode active material, carboxymethyl cellulose (CMC), and a styrene-butadiene copolymer rubber (SBR) were mixed in a mass ratio, negative electrode active material: CMC:SBR, of 100:1.5:1.0. In the produced negative electrode, the porosity due to closed pores of the graphite particles was 1%, and the porosity due to voids between particles in the negative electrode active material layer was the same as in Example 1. A non-aqueous electrolyte secondary battery was produced in the same manner as in Example 1, except that the produced negative electrode described above was used.

Comparative Example 2

In producing a negative electrode, the same conditions as in Example 1 were applied, except that the negative electrode active material, carboxymethyl cellulose (CMC), and a styrene-butadiene copolymer rubber (SBR) were mixed in a mass ratio, negative electrode active material: CMC:SBR, of 100:1.5:1.0. In the produced negative electrode, the porosity due to closed pores of the graphite particles, and the porosity due to voids between particles in the negative electrode active material layer were the same as in Example 1. A non-aqueous electrolyte secondary battery was produced in the same manner as in Example 1, except that the produced negative electrode described above was used.

Comparative Example 3

In producing a negative electrode, the same conditions as in Example 1 were applied, except that the negative electrode active material produced in Example 8 was used, and that the negative electrode active material, carboxymethyl cellulose (CMC), and a styrene-butadiene copolymer rubber (SBR) were mixed in a mass ratio, negative electrode active material: CMC:SBR, of 100:1.5:1.0. In the produced negative electrode, the porosity due to closed pores of the graphite particles was 5%, and the porosity due to voids between particles in the negative electrode active material layer was the same as in Example 1. A non-aqueous electrolyte secondary battery was produced in the same manner as in Example 1, except that the produced negative electrode described above was used.

Comparative Example 4

[Production of Negative Electrode Active Material]

Coke was crushed to an average particle size (median diameter D50) of 5 μm. Pitch as a binder was added to the crushed coke to aggregate, and an isotropic pressure was then applied to the resultant to form a molded product having a block shape and a density of 1.6 g/cm$^3$ to 1.9 g/cm$^3$. The molded product having a block shape was fired at a temperature of 2800° C. for graphitization, and the resulting molded product having a block shape was crushed. Sieving the crushed product was carried out with 250-mesh sieve to obtain graphite particles having an average particle size (median diameter D50) of 23 μm. This was used as a negative electrode active material according to Comparative Example 4.

In producing a negative electrode, the same conditions as in Example 1 were applied, except that the negative electrode active material according to Comparative Example 4, carboxymethyl cellulose (CMC), and a styrene-butadiene copolymer rubber (SBR) were mixed in a mass ratio, negative electrode active material: CMC:SBR, of 100:1.5:1.0, and that the linear pressure when pressing the coatings with a mill roll was changed to 120 kg/cm. In the produced negative electrode, the porosity due to closed pores of the graphite particles was 10%, and the porosity due to voids between particles in the negative electrode active material layer was 8%. A non-aqueous electrolyte secondary battery was produced in the same manner as in Example 1, except that the produced negative electrode described above was used.

Comparative Example 5

In producing a negative electrode, the same conditions as in Example 1 were applied, except that the negative electrode active material produced in Comparative Example 4 was used, and that the linear pressure when pressing the coatings with a mill roll was changed to 120 kg/cm. In the produced negative electrode, the porosity due to closed pores of the graphite particles was 10%, and the porosity due to voids between particles in the negative electrode active material layer was 8%. A non-aqueous electrolyte secondary battery was produced in the same manner as in Example 1, except that the produced negative electrode described above was used.

Comparative Example 6

In producing a negative electrode, the same conditions as in Example 1 were applied, except that the negative electrode active material produced in Comparative Example 4 was used; that the negative electrode active material, carboxymethyl cellulose (CMC), and a styrene-butadiene copolymer rubber (SBR) were mixed in a mass ratio, negative electrode active material: CMC:SBR, of 100:1.5:2.0; and that the linear pressure when pressing the coatings with a mill roll was changed to 120 kg/cm. In the produced negative electrode, the porosity due to closed pores of the graphite particles was 10%, and the porosity due to voids between particles in the negative electrode active material layer was 8%. A non-aqueous electrolyte secondary battery was produced in the same manner as in Example 1, except that the produced negative electrode described above was used.

Comparative Example 7

In producing a negative electrode active material, the same conditions as in Example 4 were applied, except that the amount of pitch was changed. A negative electrode and then a non-aqueous electrolyte secondary battery were produced in the same manner as in Example 1, except that the produced negative electrode active material described above was used; that the negative electrode active material, carboxymethyl cellulose (CMC), and a styrene-butadiene copolymer rubber (SBR) were mixed in a mass ratio, negative electrode active material: CMC:SBR, of 100:1.5:1.0; and that the linear pressure when pressing the coatings with a mill roll was changed to 120 kg/cm. In the produced negative electrode, the porosity due to closed pores of the graphite particles was 15%, and the porosity due to voids between particles in the negative electrode active material layer was 8%.

Comparative Example 8

In producing a negative electrode, the same conditions as in Example 1 were applied, except that the negative electrode active material produced in Comparative Example 7 was used, and that the linear pressure when pressing the coatings with a mill roll was changed to 120 kg/cm. In the produced negative electrode, the porosity due to closed pores of the graphite particles was 15%, and the porosity due to voids between particles in the negative electrode active material layer was 8%. A non-aqueous electrolyte secondary battery was produced in the same manner as in Example 1, except that the produced negative electrode described above was used.

Comparative Example 9

In producing a negative electrode, the same conditions as in Example 1 were applied, except the negative electrode active material, carboxymethyl cellulose (CMC), and a styrene-butadiene copolymer rubber (SBR) were mixed in a mass ratio, negative electrode active material:CMC:SBR, of 100:1.5:2.0, and that the linear pressure when pressing the coatings with a mill roll was changed to 350 kg/cm. In the produced negative electrode, the porosity due to closed pores of the graphite particles was the same as in Example 1, and the porosity due to voids between particles in the negative electrode active material layer was 8%. A non-aqueous electrolyte secondary battery was produced in the same manner as in Example 1, except that the produced negative electrode described above was used.

Comparative Example 10

In producing a negative electrode, the same conditions as in Example 1 were applied, except the negative electrode active material, carboxymethyl cellulose (CMC), and a styrene-butadiene copolymer rubber (SBR) were mixed in a mass ratio, negative electrode active material:CMC:SBR, of 100:1.5:2.0, and that the linear pressure when pressing the coatings with a mill roll was changed to 50 kg/cm. In the produced negative electrode, the porosity due to closed pores of the graphite particles was the same as in Example 1, and the porosity due to voids between particles in the negative electrode active material layer was 25%. A non-aqueous electrolyte secondary battery was produced in the same manner as in Example 1, except that the produced negative electrode described above was used.

Comparative Example 11

In producing a negative electrode, the same conditions as in Example 1 were applied, except the negative electrode active material, carboxymethyl cellulose (CMC), and a styrene-butadiene copolymer rubber (SBR) were mixed in a mass ratio, negative electrode active material:CMC:SBR, of 100:1.5:3.5. In the produced negative electrode, the porosity due to closed pores of the graphite particles, and the porosity due to voids between particles in the negative electrode active material layer were the same as in Example 1. A non-aqueous electrolyte secondary battery was produced in the same manner as in Example 1, except that the produced negative electrode described above was used.

[Determination of Capacity Retention in Charging/Discharging Cycles]

Each non-aqueous electrolyte secondary battery in Examples and Comparative Examples were charged at a constant current (current 1 It=800 mA, final voltage 4.2 V), and then charged at a constant voltage (voltage 4.2 V, final current 40 mA). Thereafter, the battery was discharged at a current value of 800 mA to a final voltage to 2.5 V. Such charging and discharging were regarded as one cycle, and 1000 cycles were conducted. The capacity retention of each non-aqueous electrolyte secondary battery in Examples and Comparative Examples in the charging/discharging cycles was determined by the following equation.

Capacity Retention=(Discharge Capacity in 1000th Cycle/Discharge Capacity in First Cycle)×100

Table 1 shows the results of capacity retention of each non-aqueous electrolyte secondary battery in Examples and Comparative Examples in the charging/discharging cycles. A higher capacity retention value indicates that deterioration in charging/discharging cycle characteristics was suppressed more.

TABLE 1

| | Porosity due to closed pores of Graphite Particles | Porosity due to voids between particles of Negative Electrode Active Material Layer | SBR Content | Capacity Retention in charging/discharging cycles |
|---|---|---|---|---|
| Example 1 | 3% | 15% | 1.5 mass % | 76% |
| Example 2 | 3% | 15% | 2.0 mass % | 82% |
| Example 3 | 3% | 15% | 2.5 mass % | 84% |
| Example 4 | 3% | 11% | 2.5 mass % | 78% |
| Example 5 | 3% | 18% | 2.5 mass % | 86% |
| Example 6 | 3% | 15% | 3.0 mass % | 78% |
| Example 7 | 1% | 15% | 2.5 mass % | 76% |
| Example 8 | 5% | 15% | 2.5 mass % | 70% |
| Comparative Example 1 | 1% | 15% | 1.0 mass % | 60% |
| Comparative Example 2 | 3% | 15% | 1.0 mass % | 66% |
| Comparative Example 3 | 5% | 15% | 1.0 mass % | 62% |
| Comparative Example 4 | 10% | 8% | 1.0 mass % | 62% |
| Comparative Example 5 | 10% | 8% | 1.5 mass % | 50% |
| Comparative Example 6 | 10% | 8% | 2.0 mass % | 44% |
| Comparative Example 7 | 15% | 8% | 1.0 mass % | 60% |
| Comparative Example 8 | 15% | 8% | 1.5 mass % | 66% |
| Comparative Example 9 | 3% | 8% | 2.0 mass % | 50% |
| Comparative Example 10 | 3% | 25% | 2.0 mass % | 66% |
| Comparative Example 11 | 3% | 15% | 3.5 mass % | 60% |

As clear from the results in Table 1, all of non-aqueous electrolyte secondary batteries according to Examples 1 to 8 had a higher capacity retention value in the charging/discharging cycles than non-aqueous electrolyte secondary batteries according to Comparative Examples 1 to 11. Thus, deterioration in charging/discharging cyclic characteristics can be suppressed in a non-aqueous electrolyte secondary battery including a negative electrode active material layer that includes graphite particles having a porosity due to closed pores of 1% to 5%, and has a porosity due to voids between particles of 10% to 20%, and a content of the SBR component of 1.5 mass % to 3 mass %.

REFERENCE SIGNS LIST 10 non-aqueous electrolyte secondary battery
11 positive electrode
12 negative electrode
13 separator
14 electrode assembly
15 battery case
16 case body
17 sealing assembly
18, 19 insulating plate
20 positive electrode lead
21 negative electrode lead
22 projecting portion
23 filter
24 lower vent member
25 insulating member
26 upper vent member
27 cap
28 gasket
30 graphite particle
32 void between particles
34 closed pore
36 open pore

The invention claimed is:

1. A non-aqueous electrolyte secondary battery comprising a negative electrode having a negative electrode active material layer, the negative electrode active material layer including: a negative electrode active material including graphite particles; and at least one SBR component selected from the group consisting of a styrene-butadiene copolymer rubber and a modified product thereof, wherein the graphite particles have a porosity due to closed pores of 1% to 5%, the negative electrode active material layer has a porosity due to voids between particles of 10% to 20%, and the negative electrode active material layer has a content of the SBR component of 1.5 mass % to 3 mass % based on a mass of the negative electrode active material, and wherein the negative electrode active material has a saturated tap density of 0.8 g/cm$^3$ to 1.2 g/cm$^3$.

* * * * *